INVENTORS
Charles A. Toce
Robert Broussard
BY
THEIR ATTORNEY

INVENTORS
Charles A. Toce
Robert Broussard

THEIR ATTORNEY

April 18, 1961  C. A. TOCE ET AL  2,980,751
ELECTRIC STORAGE BATTERY AND CASE
Filed Sept. 20, 1957  3 Sheets-Sheet 3

INVENTORS
Charles A. Toce
Robert Broussard
BY
THEIR  ATTORNEY

United States Patent Office 2,980,751
Patented Apr. 18, 1961

2,980,751

ELECTRIC STORAGE BATTERY AND CASE

Charles A. Toce, Sunland, and Robert Broussard, Glendale, Calif., assignors to Electro-Acid Corporation of Nevada, a corporation of Nevada Filed Sept. 20, 1957, Ser. No. 685,225

5 Claims. (Cl. 136—166)

Our invention is concerned with electric storage batteries; more particularly a new and improved container for electric storage batteries which displays many highly advantageous properties.

An important object of our invention is to provide a new case for electric storage batteries which functions at high efficiency and affords requisite cooling under the most severe extremes of operating conditions, to that end providing for ready and sweeping access by and circulation of air through the several cell containers and exposing important surface areas to heat dissipation.

Another object is to provide a battery case in which absorption of electrolyte is brought to a minimum; wherein for all practical purposes seepage of electrolyte is entirely eliminated; which battery case is substantially immune to breakage; and which in actual use will not warp, crack or fail under the aforesaid drastic extremes of temperatures.

A further object is to produce a storage battery case of the general type described, characterized in part by its light weight with attendant reduction in shipping charges, and in part by its long useful life with substantial immunity to failure in service, any crack or defect which does occur being readily exposed to and susceptible of prompt detection; and which is further characterized by its low cost, not only of component materials, but in initial construction and subsequent maintenance.

Other objects of our invention will in part be obvious and in part more fully pointed out hereinafter, during the course of the following disclosure.

Our invention accordingly resides in the several component parts, elements, materials and features of construction and in the relation of each of these to one or more of the others, an understanding of which more fully attends a consideration of the disclosure of the drawings, and the scope of the application of all of which is more fully set forth in the claims at the end of this disclosure.

Figure 1:
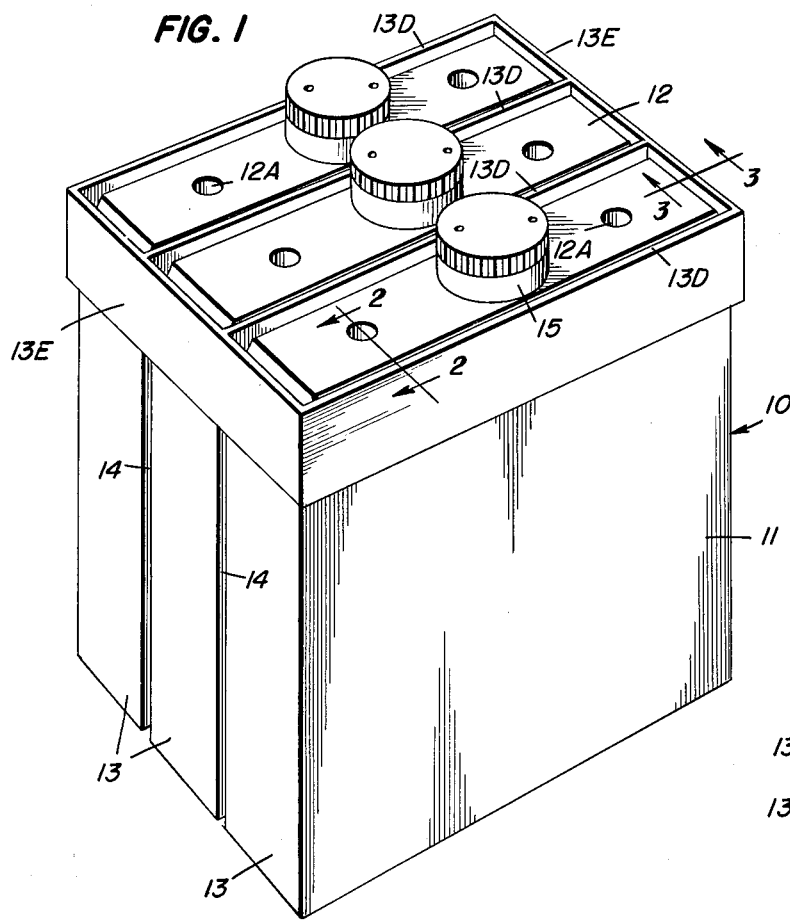
Figure 3:
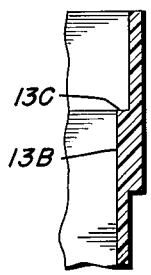
Figure 4:
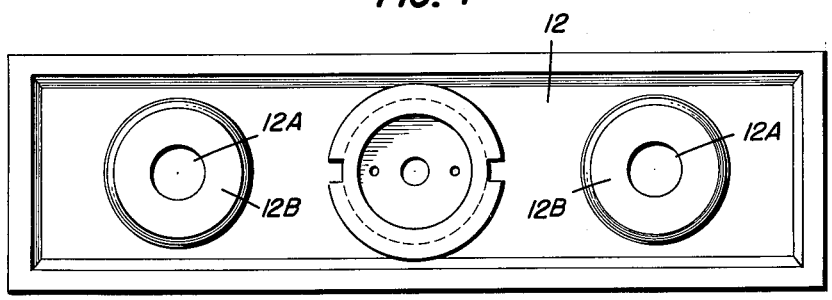
Figure 2:
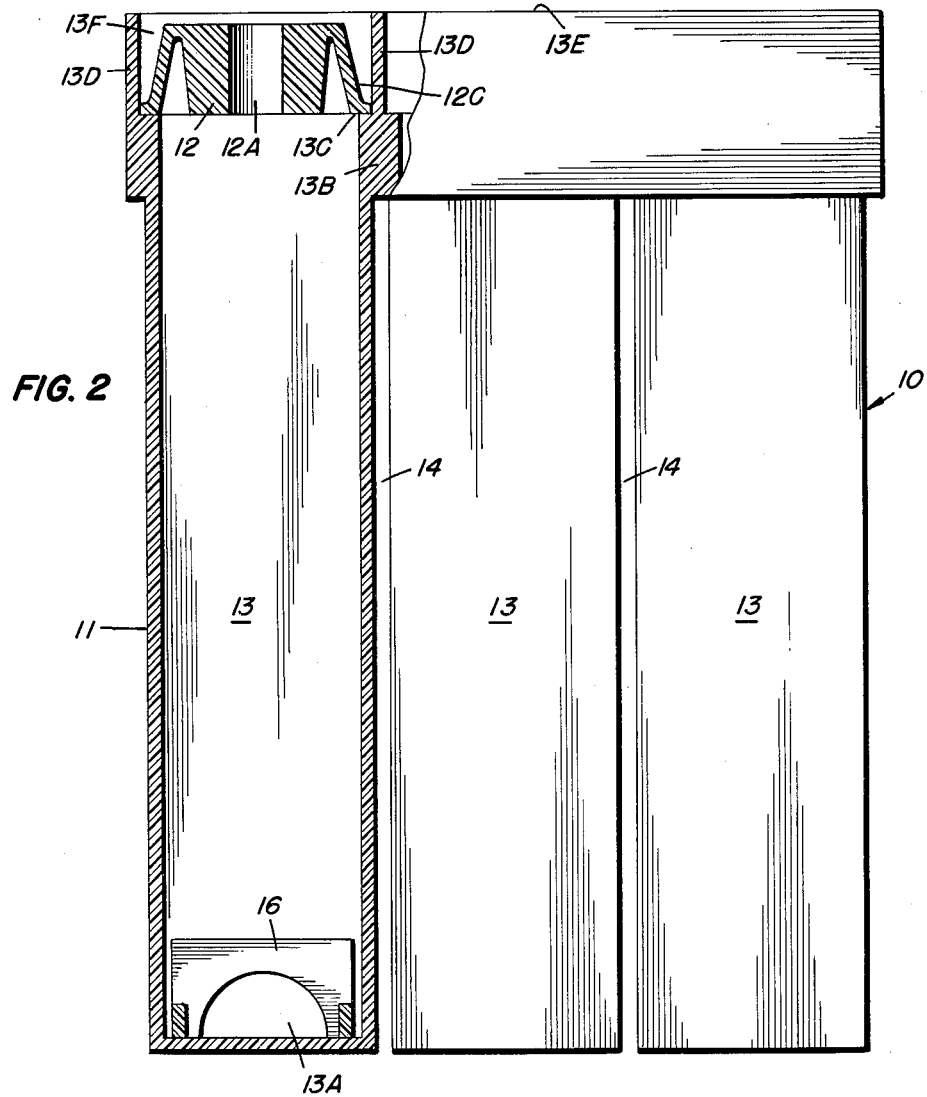
Figure 5:
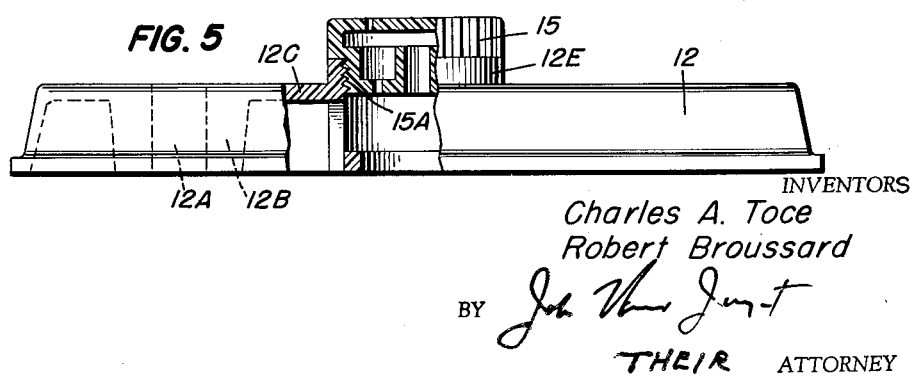
Figure 6:
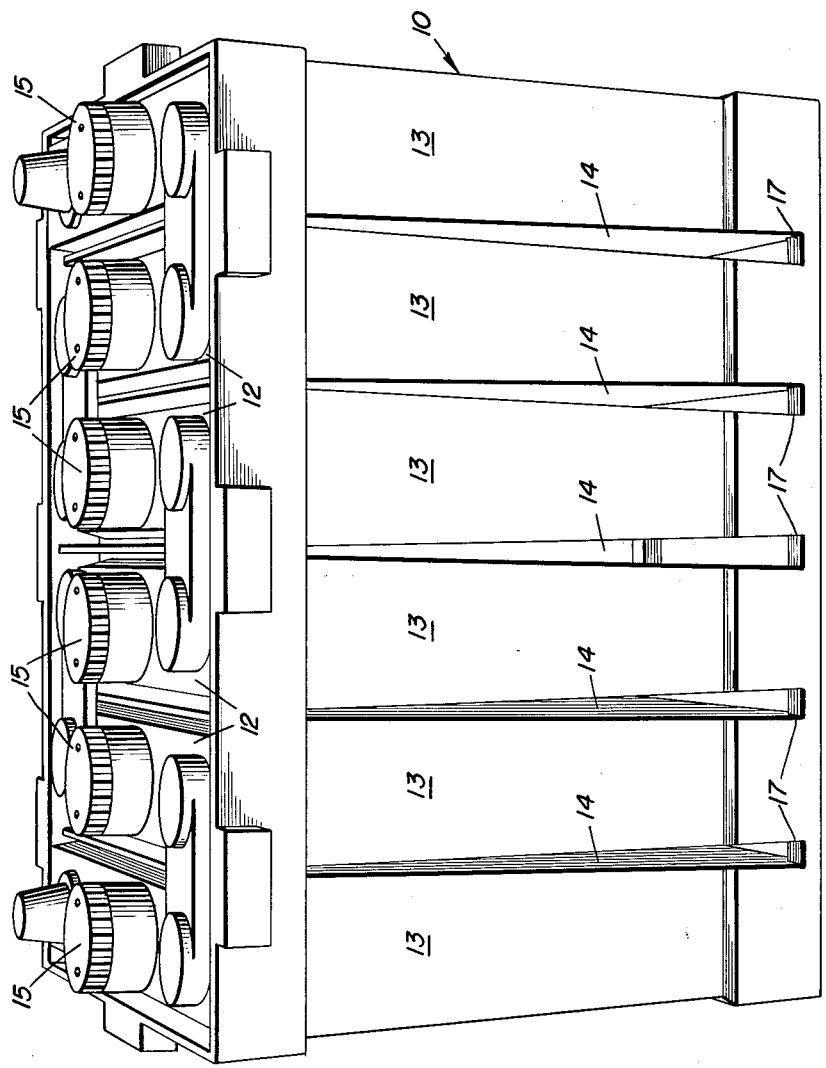

In the several views of the drawings, wherein we disclose that embodiment of our invention which we prefer at the present, Fig. 1 is a perspective view of the assembled case employed in the battery of our invention, showing the separate tops for the case as applied to the ensemble of separate plate containers, and which latter are integrally connected together;

Fig. 2 discloses in vertical end elevation, a case for a three-cell battery according to the present invention, with parts broken away to disclose one cell in section and showing relationship of the related cell container to the cover which is applied thereon, the section being taken on line 2—2 in Fig. 1;

Fig. 3 is a fragmentary vertical section through an upper and side rim of the battery case, taken along the line 3—3 of Fig. 1;

Fig. 4 is a bottom plan view of one of the removable tops which are shown in Fig. 1 and which are applied, one to each plate container within the bottom case portion of Fig. 1; and Fig. 5 is a side elevation, taken on a vertical plane, of the cover element or removable top of Fig. 4, with parts sectionalized for clarity of disclosure; while Fig. 6 is a side view showing, as a further embodiment, a six-cell battery, according to our invention.

Throughout the several views of the drawings, like reference characters denote like structural parts.

As conducive to a more thorough understanding of our invention it may be noted at this point in the disclosure that with rapidly increasing demand made for electrical supply in a vast variety of applications, of which automobile equipment is illustrative, and similar applications being found in many stationary installations, greater and greater demands are being presently made for the electric storage battery. Thus batteries are required of importantly increased rating. And these batteries must display operating characteristics which are entirely satisfactory, and this under the most extreme swings in both load demand and operating conditions.

Overheating results in frothing, loss of electrolyte, damage to surrounding equipment and early failure of the battery itself. Thus, the problem of ventilation, long recognized to be most serious, in recent years has assumed more and more importance in the industry. And the highly significant implications thereof have long been recognized in the art. By consequence, much attention has been directed to the problem of maintaining reasonable temperatures within the battery cells at all times, and even under severe and prolonged load demand and under severely elevated operating temperatures.

Moreover, with the battery art being one which already is highly competitive, important demand has long existed for a battery capable of prolonged operation at high energy levels, and which will display requisite satisfactory performance with long useful life and in the substantial absence of tendency to fail, which battery at the same time responds to the requirement of low cost of production and which can be rapidly and directly produced in simple manner, with labor of but moderate skill, in minimum time, with minimum equipment, and from materials which are inexpensive in themselves.

An important object of our invention, therefore, is to provide a case for an electric storage battery as well as the battery itself, which latter is rendered capable, by virtue of the casing thus provided therefor, of operating at prolonged high energy levels, which provides adequate ventilation in simple and direct manner under all extremes of operating conditions, including both energy demand and operating temperature, which is sturdy in operation and of long useful life, and which is low in cost, is light in weight, and can be transported at minimum expense.

Referring now more particularly to the several embodiments of our invention as disclosed in the accompanying drawings, it will be seen that our invention comprises an integral battery case indicated generally at 10. While this case may be formed of any suitable material, we prefer to form it by molding and preferably from a suitable amorphous material. While hard rubber or plastics may be employed we prefer a comparatively new plastic marketed under the trade name "Cycolac." When the battery case is formed in its desired suitable form from this plastic, as by injection, extrusion, die or other convenient and conditional molding processes, we find that even after prolonged exposure to severe and extreme operating conditions, both of temperature swings within wide limits and heavy duty operating demands, the battery case formed of Cycolac displays practically no tendency to break. Nor will it warp, crack or otherwise fail under the conditions encountered in actual operation. Moreover, cracks or defects in a case formed of Cycolac plastic, because of the color of the latter, are immediately noticeable. And this, as distinguished sharply from the type of fissures which are sometimes encountered where the battery case is formed either of hard rubber or bituminous material. In these latter instances and quite on the contrary, prolonged seepage of electrolyte may maintain without observation, attended by ultimate and premature battery failure.

The casing, indicated generally at 10 as in Fig. 1, in its broad concept is divided into two parts. These include a bottom part or main casing portion, indicated generally at 11. This portion 11 carries the usual battery plates. And cooperating with this bottom portion 10 is a plurality of like and separate, individual top or cover members 12. Both the bottom portion 11 and the top members 12 are preferably formed of the Cycolac plastic heretofore mentioned. Thus, the advantages peculiar to that plastic are realized in members 10 and 12.

As best seen in Figs. 1 and 2, the bottom or main casing portion 11 is made up of a plurality of compartments 13, each in large measure structurally and functionally separate from each other. It is these compartments 13 which house the active plates of the battery. Preferably and usually, although not absolutely necessary, there is one such container 13 for each cell of the battery. Thus in a typical six-volt, three-cell battery, there are three such containers 13. The leftmost container 13 in Fig. 2 is disclosed in sectional view.

At the bottom of container 13 we provide a rack 16, for supporting a series of battery plates (see Fig. 2). The rack 16, serving as a support for the battery plates, usually is simply dropped into the bottom 13A of each cell portion of the housing, i.e. into the bottom of compartment 13. The present invention, however, is not concerned with the exact construction of the rack 16. Typically, but not necessarily, we may employ a rack constructed according to and responding to the disclosure of the prior patent to Gritman No. 2,767,237.

As noted at an earlier point herein, we impart adequate and assured, straight-through ventilation to our battery casing. That is, we ensure that each cell container 13 stands separately and apart from the other cell containers, and is thoroughly washed by air. Thus, the heat originating and emitting from each cell is released to the air directly and through radiation. There is no opportunity for build-up of heat between the cells, pyramiding in cumulative manner.

In accordance with our invention we space the containers apart along their major vertical faces, i.e. from left to right in Fig. 1, and to a substantial extent, as indicated at 14 in Figs. 1 and 2. In both the three-cell construction according to Fig. 1 and the six-cell construction (Fig. 6), i.e. 6 and 12 volts respectively, the separate containers 13 are integrally molded or otherwise formed together at the tops of these containers 13, as at 13B (Fig. 2). Thus the main casing portion 11 is comprised as a single intergral unit, the cell containers 13 of which are themselves separate and apart from each other except at these relatively limited points of common bonding. And the openings 14, of substantial width, extend completely across the major faces of the containers 13 and provide for thorough air wash of the heat emitted in each cell of the battery. That is, each container 13 of the main casing portion 11 is itself, and for all practical purposes, almost completely encased in a bath of air.

The main casing portion of the six-cell embodiment differs from the corresponding main casing portion 11 of Fig. 1 in that recognition has been given in the enlarged six-cell construction to the additional size and weight. In this embodiment according to Fig. 6 each container is joined at its bottom edge and along the two major sides thereof by integrally formed joining strips or webs 17. Other than in this respect the bottom casing according to Fig. 6 is almost identical with that shown in Fig. 1, with the exception that six containers 13 are provided rather than three such containers.

As already stated, we provide a separate top or cover member 12 for each compartment 13. And for ready mounting, we desire to seat each cover 12 (see Fig. 2) on a corresponding shoulder within and shortly below the upper edge of each such container 13. To achieve this, we find it advantageous to provide an internal rim or shoulder extending about the interior of each container 13, shortly below the top and open edge of this container. And we find it desirable to provide such internal peripheral rim 13C by molding the same, preferably as part of the single-phase or single-stage molding operation in which the main casing portion 11 is formed. To impart adequate strength qualities to the upper portions of the main casing portion 11, while responding to the teaching of our invention, we enlarge the upper portion 13B of casing potrion 11 as shown in Fig. 3, and in so doing, provide the peripheral rim 13C which we have already referred to. With molded construction as thus provided, upstanding support and guide walls are provided, as best shown in Figs. 1 and 2, the longitudinal walls being disclosed at 13D and the lateral walls at 13E.

The rectangular construction of each removable top or cover member 12 nicely conforms with the internal configuration and dimensioning of the top, open portion of each container 13. And each container 13 has like dimensioning. Thus these cover members 12 are adapted to drop nicely into the corresponding recessed upper portion of related containers 13, as shown at 13F in Fig. 2.

Referring now more particularly to the top member construction according to Fig. 4 (see also the other figures of the drawings), it will be seen that we provide each like top member 12 with like terminal-receiving ports 12A provided symmetrically with respect to the centers of the cover members, and somewhat short of each end thereof. This construction is such that, upon assembly of a group of plates within each cell, with terminal posts projecting upwardly therefrom in conventional manner, these posts will extend through the holes 12A and protrude upwardly therefrom. The posts are thereupon ready, some for connection with the usual battery jumpers, connectors or straps, and paired end terminal posts for connection to external circuit.

As perhaps best seen in Figs. 2 and 5, the molded construction of the tops 12 is such that substantial strength is had in each cover member. Even through the cover members are normally exposed to but little stressing under the usual operating conditions encountered, more than sufficient mechanical strength is had. Thus, the web of molded plastic 12B defining the terminal opening 12A (see Fig. 2) has both substantial thickness in cross-sectional dimensions and substantial depth along the major vertical axis of the related container 13. The horizontal side walls 12C of the tops 12 (Fig. 5), but which initially extend inwardly and upwardly from shoulders 13C as viewed in vertical section, are comparatively thin, reliance for strength being placed upon the generally corrugated construction best disclosed in Fig. 2. To improve factors of mechanical strength all edges and reverse curvatures are taken off of sharp, discontinuous junctions, thereby greatly reducing likelihood of localized failure. And it will be seen from the disclosure of Fig. 5 that, as compared to the dimensioning of the port-providing bosses 12B, the plane body portion 12C has but moderate thickness consistent, however, with requisite factors of strength.

Within each cover member 12 (Fig. 1) and preferably centrally thereof we provide a conventional vent and filler cap indicated generally at 15. Each such filler cap is threaded or otherwise secured, as at 15A (Fig. 5), to a complemental and internally threaded boss 12E molded or otherwise formed of each cover member 12. This construction is typical, and will not be further discussed in this disclosure.

With the foregoing construction in mind, a typical mode of assembling the battery will now be discussed. Thus, the battery plates of each cell are first assembled and are dropped in a selected one of the assembled but separate plate-receiving compartments 13 and onto the rack 16, which has been preliminarily dropped into the cell. A corresponding top or cover 12 is then applied, with the terminal-receiving openings 12A, 12A nicely spotted over the terminal posts (not shown) which project upwardly through them. Conventional battery compound is then poured around the edge of each cover and within the trough provided by the upstanding ends 13D, 13E, mechanically securing the cover in position and sealing it against possible loss of electrolyte. This is in the manner of the conventional storage battery. Conventional terminal connectors are applied and electrolyte is added through ports 15, either at the factory or preferably following transit in empty and light-weight condition, at the retail outlet and upon sale. The battery is then ready for service.

Formation of the battery case from Cycolac plastic effectively guards against any serious hazard of breakage, warping, cracking or failure after repeated extreme cycles of use, and this even following prolonged and repeated thermal stressing.

Maximum heat dissipation is effectively provided, importantly contributing to the maintenance of permissible operating temperatures, within but limited thermal swings within the battery, even during prolonged and heavy-duty service. Possessing requisite sturdiness, the new battery case is light in weight. Substantial savings in shipping charges are made possible. The new casing is substantially impervious to penetration by electrolyte so that absorption of the latter is minimized. Loss of electrolyte is rendered negligible. No seepage of electrolyte is observed. The nature of the plastic is such that any crack or defect in the battery case becomes noticeable at once. This distinguishes sharply and advantageously from the almost imperceptible—certainly in their earlier phases—type of fissures which sometimes appear in battery cases made of hard rubber or bituminous products and which bring about seepage of electrolyte, usually and shortly followed by ultimate battery failure.

By our new construction each cell of the battery is provided in a separate and thermally independent compartment each of which is entirely open, for all practical purposes, to complete circulation of air and thermal washing thereby. The storage battery is thus adequately cooled and ventilated. At the same time, all containers are formed in mechanically and physically integral structure, possessing requisite qualities of mechanical strength, and this from a single blob or ball of the plastic from which is formed the main portion 11 of the battery casing.

Sturdy in its prolonged, useful life, inexpensive in both first cost and in subsequent maintenance, light in weight and inexpensive in transport, our new battery casing displays markedly superior qualities of ventilation and hence operating characteristics. All hazard of electrolyte damage to adjacent equipment is suppressed.

All the foregoing as well as many other highly practical objects and advantages, attend the practice of our invention.

Since many possible embodiments may be made of our invention, and since many changes may be made in the embodiment which we have disclosed herein, we desire that all material disclosed in this disclosure be interpreted simply as illustrative and not as comprising limitations.

We claim as our invention:

1. An electric storage battery comprising a molded plastic main case, which case is itself formed of a number of substantially separate containers, all integrally molded together near their top portions and providing between related containers substantially free and unobstructed air passage, each container being internally and peripherally shouldered near its top portion for the reception of a cover member; plates of a complete battery cell housed in each of said containers and having terminal posts projecting upwardly therefrom; and a number of separate cover members, one for each container, seated on related peripheral shoulders of said containers and having included ports for engaging about the protruding terminal posts and for the introduction of electrolyte, the said cover members being sealed to the containers and about the said terminal posts.

2. A complete and multipart battery casing comprising a main battery casing portion comprised of a plurality of largely separate containers, which containers are integrally molded together near their top portions while providing between the containers substantially free and uninterrupted channels for the passage of ventilating air, each container being internally and peripherally shouldered near its top for the reception of a related cover member; and a corresponding plurality of separate and removable cover members, one for each such container, for reception on the peripheral shoulders of the related containers and adapted to be sealed thereto and about the terminal posts of related battery cells.

3. A molded battery case comprising a plurality of separate containers, each for a separate battery cell, which containers are integrally formed together at the regions of their top portions, but otherwise are spaced apart to provide between them substantially free and uninterrupted air channels for ventilation.

4. A battery case for a three-cell electric storage battery, said case being formed of a moldable solid maerial and comprising three separate containers for battery plates, which containers are integrally molded together at the region of their top portions but otherwise are spaced apart, thereby providing between said containers ventilating air spaces which are substantially unobstructed throughout the major portions of their faces.

5. A battery case for a six-cell electric storage battery, which case is molded from plastic and comprises six separate containers for battery plates, and which said six containers are integrally molded together only in the region of their top portions and bottom portions, thereby providing substantially unobstructed ventilating air space between adjacent containers throughout the major portions of their faces.

References Cited in the file of this patent

UNITED STATES PATENTS

| | | |
|---|---|---|
| 672,219 | Stevens | Apr. 16, 1901 |
| 673,678 | Chamberlain et al. | May 7, 1901 |
| 729,550 | Condict | June 2, 1903 |
| 1,034,003 | Edison | July 30, 1912 |
| 1,091,583 | MacGlashan | Mar. 31, 1914 |
| 1,298,857 | Angell | Apr. 1, 1919 |
| 1,304,588 | Monahan | May 27, 1919 |

FOREIGN PATENTS

| | | |
|---|---|---|
| 505,048 | Great Britain | May 4, 1939 |
| 286,863 | Great Britain | Mar. 15, 1928 |